United States Patent [19]
Moskovich

[11] Patent Number: 4,629,291
[45] Date of Patent: Dec. 16, 1986

[54] ZOOM LENS

[75] Inventor: Jacob Moskovich, Cincinnati, Ohio

[73] Assignee: Vivitar Corporation, Santa Monica, Calif.

[21] Appl. No.: 597,539

[22] Filed: Apr. 6, 1984

Related U.S. Application Data

[63] Continuation-in-part of Ser. No. 189,591, Oct. 1, 1980, Pat. No. 4,462,664, which is a continuation-in-part of Ser. No. 82,010, Oct. 5, 1979, abandoned.

[51] Int. Cl.[4] .............................................. G02B 15/16
[52] U.S. Cl. .................................................. 350/427
[58] Field of Search ......................................... 350/427

[56] References Cited

U.S. PATENT DOCUMENTS 2,847,907  8/1958  Angenieux ........................... 350/427
4,449,791  5/1984  Terasawa et al. .................... 350/427

Primary Examiner—John K. Corbin
Assistant Examiner—Rebecca D. Gass
Attorney, Agent, or Firm—Costas, Montgomery & Dorman

[57] ABSTRACT

A zoom lens having a range of equivalent focal lengths from a dimension below the diagonal of the image frame to above with a zoom ratio of substantially three to one or greater having a second negative lens unit of relatively strong optical power where the second lens unit comprises a negative component, a positive meniscus concave to the object and a doublet including a positive element convex to the object and the optical power of the positive element of said doublet is substantially greater than the optical power of said positive meniscus.

10 Claims, 5 Drawing Figures

ZOOM LENS

RELATED APPLICATIONS

This application is a continuation-in-part of Application Ser. No. 189,591, filed Oct. 1, 1980 now U.S. Pat. No. 4,462,664, which was a continuation-in-part of Application Ser. No. 082,010, filed Oct. 5, 1979, now abandoned.

FIELD OF THE INVENTION

This invention relates to zoom lenses and more particularly relates to zoom lenses having a range of equivalent focal lengths from a dimension below the diagonal of the image frame of the lens to a dimension above, which may be considered long focus or telephoto.

BACKGROUND OF THE INVENTION

At the present time, there is an ever-present design objective of providing improved zoom lenses having an equivalent focal length (EFL) range from a dimension below the diagonal of the image frame (defined as wide angle) of the lens to a long focus or telephoto length. In the case of the popular 35 mm cameras, the diagonal of the image frame, which measures 24 mm by 36 mm, is 43.6 mm. Most camera manufacturers and lens designers strive to provide a lens having a lower equivalent focal length of 28 mm or 35 mm extending to a range of 105 mm or above. Such range or equivalent focal lengths are easy to design in a lens if compactness of the lens is not a serious design parameter.

However, where compactness of the lens, both from the standpoint of length and barrel diameter are a consideration, the design criteria for such lens becomes much more stringent. U.S. Pat. No. 4,299,454, provides a lens design which is compact and of very good optical quality. The design of U.S. Pat. No. 4,299,454 appears in the lenses of several manufacturers. More specifically, the design of this patent is directed to a three or four lens unit lens in which the second lens unit has certain power relationships to the overall power of the lens at its equivalent focal length and further which has certain parameters which provide sufficient color correction and correction for spherical aberration as the second lens unit of large negative power moves to vary the equivalent focal length. As used herein, the term "lens unit" refers to one or more lens elements air spaced from another lens unit of one or more lens elements. A lens unit may be axially movable to vary the equivalent focal length of the lens and/or compensate for variation in the position of the image frame due to change in equivalent focal length of the lens.

Also, U.S. Pat. No. 4,256,381 discloses a wide angle to long focus zoom lens in which the aperture defining mechanism remains stationary during zooming and has very closely spaced thereto an element of small optical power. This construction further enhances the compactness of a wide angle to long focus zoom lens.

The present invention also provides a compact design for a wide angle to long focus compact zoom lens in which the design of the second lens unit provides strong overall negative optical power, together with low surface contributions of spherical aberrations which means that the second lens unit is relatively insensitive to small manufacturing and assembly errors.

SUMMARY OF THE INVENTION

Briefly stated, the invention provides a wide angle to long focus zoom lens which may be embodied in either a three or four lens unit zoom lens in which the second lens unit is of strong negative optical power and has a characteristic construction. The second lens unit has a negative element followed by a positive meniscus concave to the object followed by a negative doublet comprising a negative element and a positive element convex to the object. This construction permits strong overall negative optical power, together with low surface contributions of spherical aberration. The second positive meniscus element is substantially weaker than the positive element of the doublet. This effectively helps to minimize distortion without introducing significant effects of spherical aberration.

An object of this invention is to provide a wide angle to long focus zoom lens of the type described, having a new and improved second lens unit of negative power which is relatively insensitive to manufacturing and assembly errors.

The features of the invention, which are believed to be novel, are particularly pointed out and distinctly claimed in the concluding portion of this specification. However, the invention, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
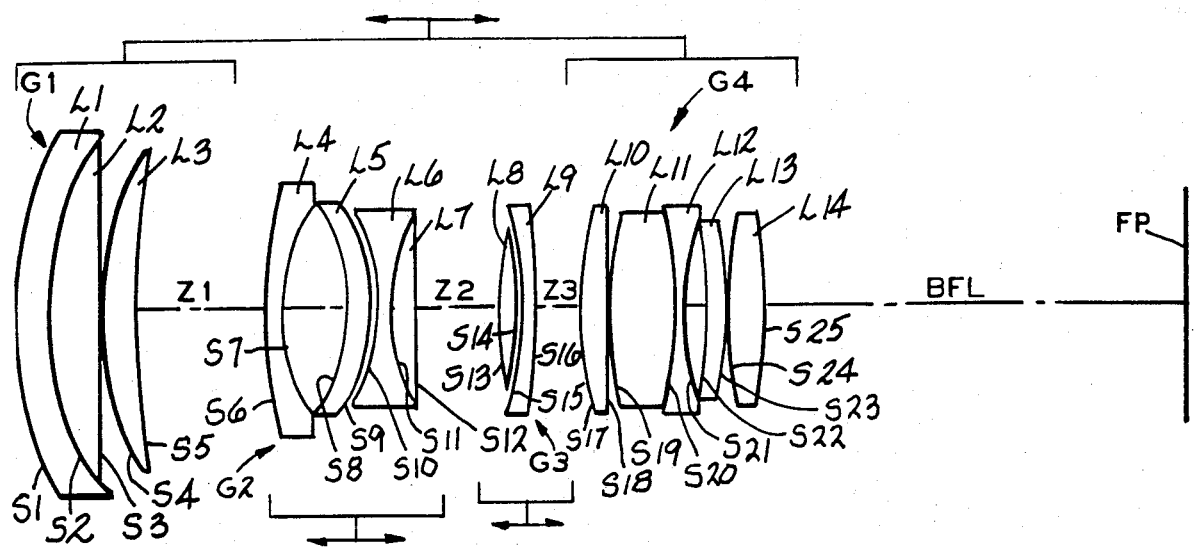
FIGS. 1-3 are schematic side elevations of four lens unit zoom lenses embodying the invention.

Lenses embodying the invention are arranged in either three or four lens units. In the case of the three group lens, the third group may be divided into two sub-lens units which move relative to each other.

The inventive feature of all of the disclosed lenses is in the form and relative powers of the second lens unit which is of strongly negative power.

In the drawings and following description, lens elements are indentified by the reference L followed by an arabic numeral progressively from the object end to the image end. The optical lens units of each lens are identified by the reference G followed by an arabic numeral progressively from the object end to the image end. The variable airspaces between the movable lens units are denoted by Z followed by an arabic numeral progressively from the object end to the image end. The back focal length (BFL) is the distance from the last surface of the lens on the optical axis to the film plane FP. The lens element surfaces are identified by the reference S followed by an arabic numeral progressively from the object end to the image end.

Figure 2:
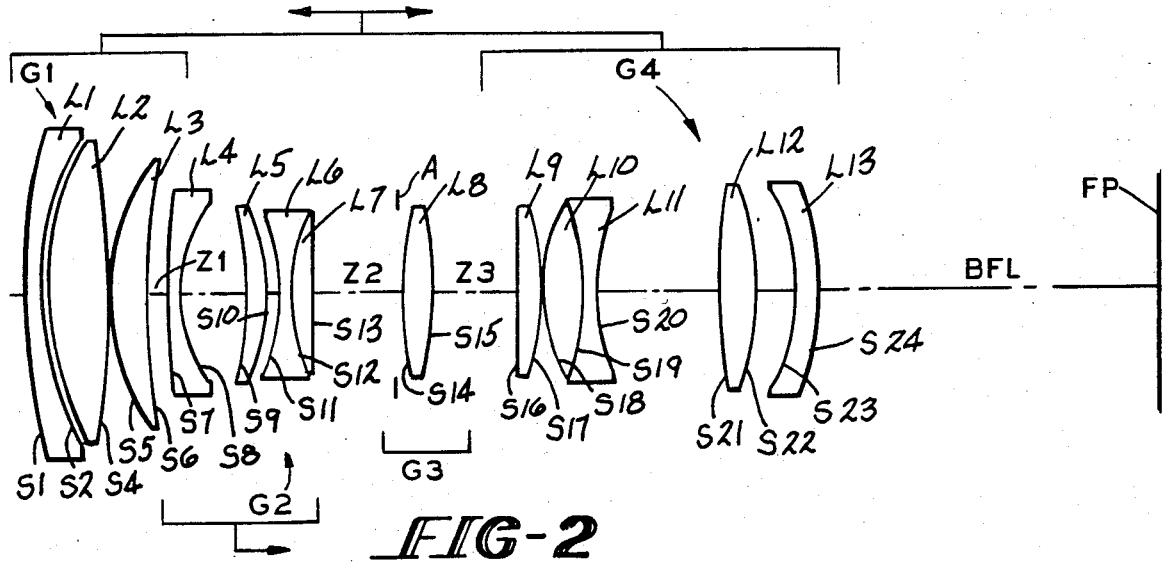
Figure 3:
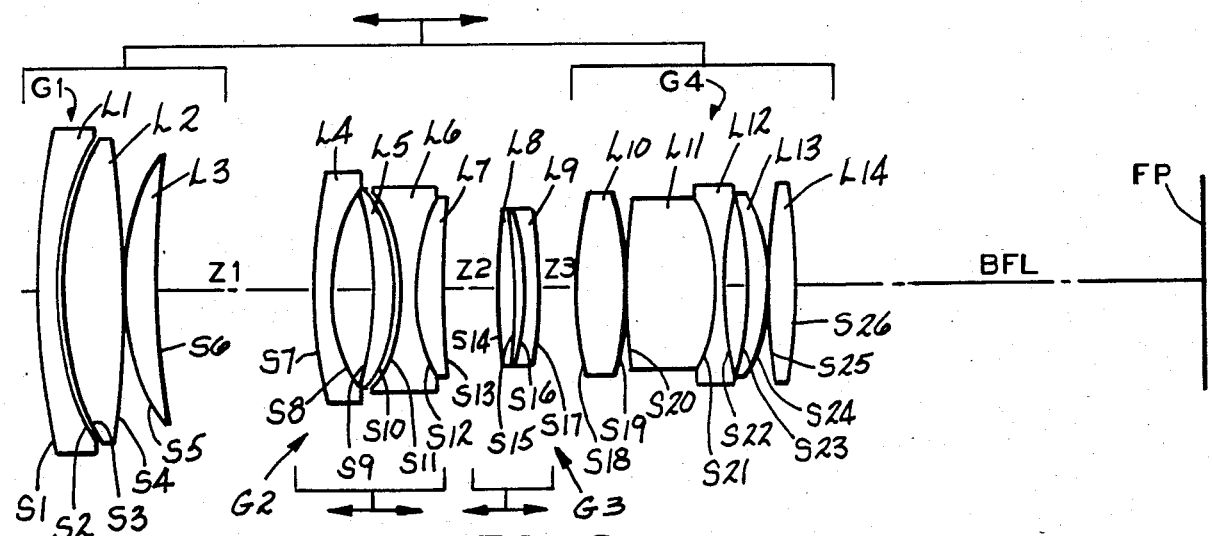

In the embodiments of FIGS. 1-3, the lenses comprise a first positive lens unit G1 comprising a positive doublet L1, L2 either cemented or slightly airspaced followed by a positive meniscus L3 convex to the object end.

In all embodiments, the second lens unit G2 comprises a negative element in the form of a meniscus L4 convex to the object end, a positive meniscus L5, concave to the object end, and a doublet comprising a biconcave element L6 and a positive element L7.

The third lens unit is positive and may be a doublet L8 and L9 as shown in FIGS. 1 and 3 or a singlet L8 as shown in FIG. 2.

The fourth lens unit is positive and may take various forms as shown in FIGS. 1-3, and defined in Table I-III.

In the lens shown in FIGS. 1-3 and described in Tables I-III, the first lens unit G1 and the fourth lens unit G4 move in fixed relation.

In the lens of FIG. 1, the second lens unit G2 and the third lens unit G3 move in opposing directions through the zoom range.

In the lens of FIG. 2, the second lens unit G2 moves in opposite direction to lens units G1 and G4 during zooming while lens unit G3 and the aperture A remain stationary as described in U.S. Pat. No. 4,256,381.

In the lens of FIG. 3, the second lens unit G2 and the third lens unit G3 move in opposite directions as the first and fourth lens units move in fixed relation.

The arrangement of the second negative lens unit in all examples is most important to the design of the lens. The negative meniscus L4 is a fairly standard element in a negative second lens unit. The positive meniscus L5 contributes to the correction of distortion and is of relative weak positive optical power. If made of strongly positive power, it would introduce too much spherical aberration. Also, if L5 was made to be strongly positive, it would require more negative power in L4 or L6, introducing other aberrations, particularly spherical. The doublet L6, L7 provides the necessary color correction, and is of overall negative power.

The second lens unit G2 is of overall strong negative optical power which permits small axial motion during zooming between the extremes of the EFL range to contribute to a compact lens. The configuration of the doublet L6, L7 is favorable for minimizing the contributions to aberrations while minimizing errors due to manufacturing tolerances in decentration and tilt. The congiguration of the second lens unit G2 further permits the use of less expensive glass elements of the lower index of refraction crown glasses. The configuration of the second lens unit G2 further contributes to the correction of astigmatism and distortion in the wide angle (shorter EFL ranges) and spherical aberration at the longer EFL's.

In the aforesaid construction of the second lens unit G2, it is important that the ratio of the optical power of element L7 to element L5 is at least three to one.

A further preference is that the absolute optical power of the second lens unit G2 of the lens in relation to the geometric mean power $K_M$ of the lens at the extremes of its EFL range is $$3.0 < |K_2/K_M| < 5.0$$

where
$$K_M = \sqrt{K_S K_L}$$
and $K_S$ is the optical power of the lens at its shortest EFL, and $K_L$ is the optical power of the lens at its longest EFL, where the optical power is expressed as the reciprocal of the EFL in millimeters.

The lenses of FIGS. 1-3 are substantially described in the following tables I-III, respectively, in accordance with the reference characters previously stated.

Figure 4:
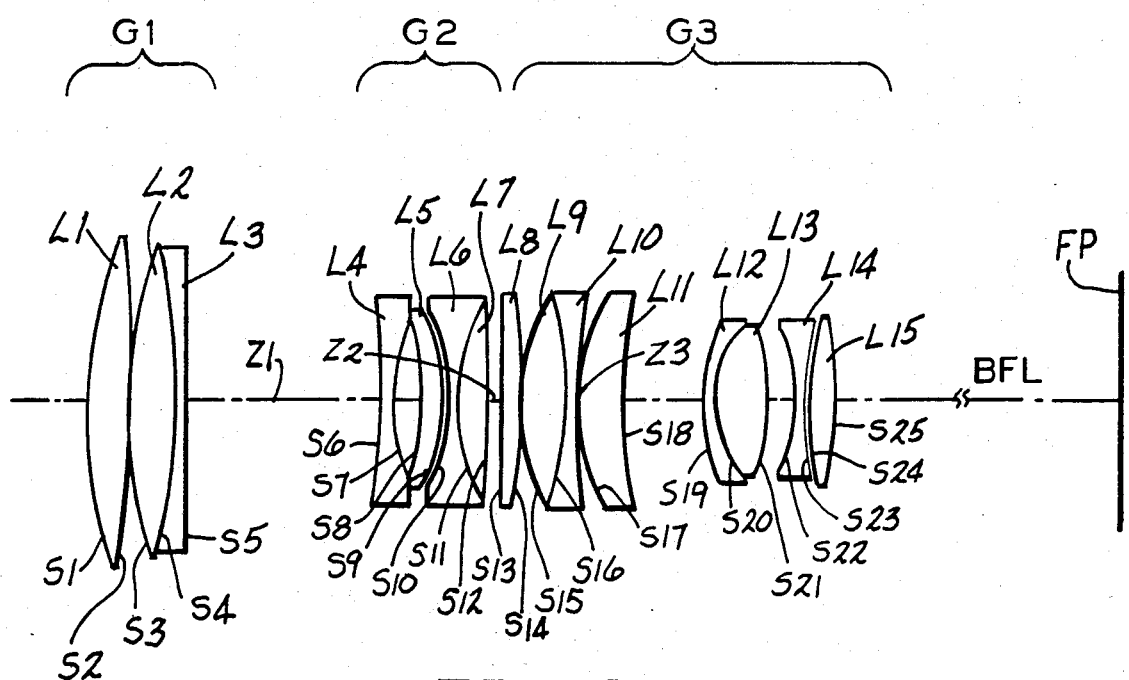
FIGS. 4 and 4a are schematic side elevations of a three lens unit zoom lens embodying the invention.
Figure 4A:
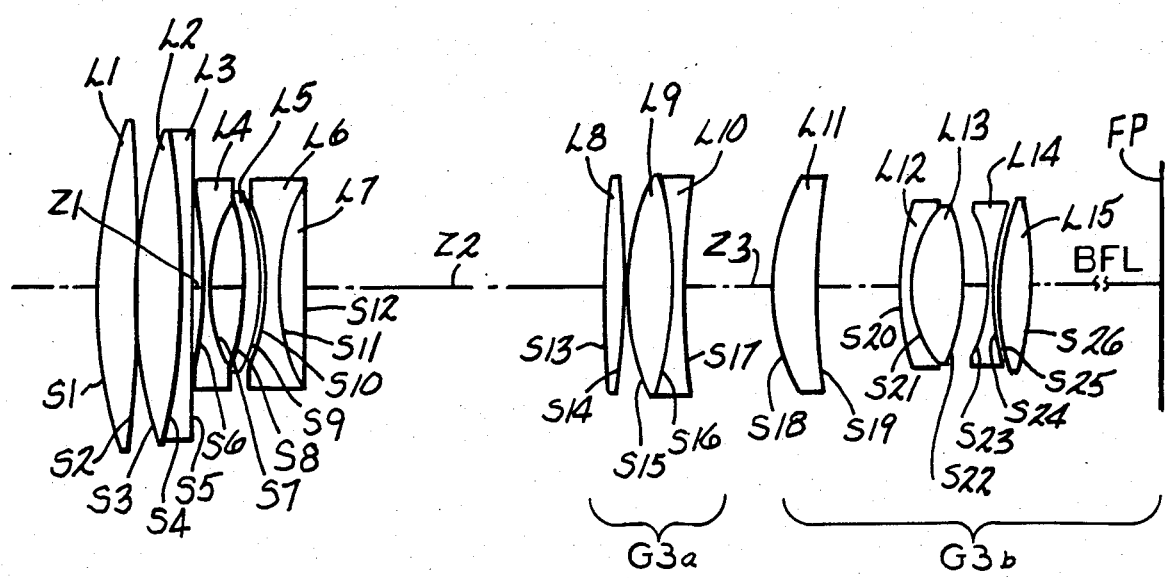

The lens of FIGS. 4 and 4a is described as having only three lens units with the third lens unit comprising sub-lens units G3a and G3b which move in the same direction during zooming although at different rates, in distinction to the lenses of FIGS. 1-3. However, the lens of FIGS. 4a and 4b may be considered to comprise four lens units with the sub-lens unit G3b being the fourth group and sub-lens unit G3a being the third lens unit.

In the lens of FIGS. 4a and 4b, lens unit G1 does not move during zooming. The lens is shown in the shortest EFL position in FIG. 4, and in the longest EFL position in FIG. 4a.

The lenses of the following tables are scaled for EFL's as stated to an image frame of 24×36 mm. The EFL ranges are shown under the zoom spacing data.

TABLE I

| Lens | | Radii (mm) | Axial Distance Between Surfaces (mm) | $N_D$ | $V_D$ |
|---|---|---|---|---|---|
| L1 | S1 | 82.449 | | | |
| | | | 2.500 | 1.785 | 26.1 |
| | S2 | 53.360 | | | |
| L2 | | | 7.800 | 1.487 | 70.4 |
| | S3 | −345.520 | | | |
| | | | .110 | | |
| | S4 | 50.867 | | | |
| L3 | | | 5.700 | 1.487 | 70.4 |
| | S5 | 168.401 | | | |
| | | | Z1 | | |
| | S6 | 73.978 | | | |
| L4 | | | 1.400 | 1.834 | 37.3 |
| | S7 | 22.998 | | | |
| | | | 7.520 | | |
| | S8 | −35.332 | | | |
| L5 | | | 3.000 | 1.517 | 64.2 |
| | S9 | −26.613 | | | |
| | | | 1.500 | | |
| | S10 | −24.308 | | | |
| L6 | | | 1.200 | 1.746 | 52.2 |
| | S11 | 19.378 | | | |
| L7 | | | 4.200 | 1.805 | 25.5 |
| | S12 | 300.594 | | | |
| | | | Z2 | | |
| | S13 | 65.464 | | | |
| L8 | | | 2.100 | 1.849 | 38.3 |
| | S14 | −67.241 | | | |
| | | | .540 | | |
| | S15 | −37.319 | | | |
| L9 | | | 1.300 | 1.839 | 24.5 |
| | S16 | −56.687 | | | |
| | | | Z3 | | |
| | S17 | 35.354 | | | |
| L10 | | | 4.000 | 1.497 | 76.3 |
| | S18 | 14660.316 | | | |
| | | | .100 | | |
| | S19 | 59.892 | | | |
| L11 | | | 9.944 | 1.487 | 70.4 |
| | S20 | −47.300 | | | |
| L12 | | | 1.200 | 1.805 | 25.5 |
| | S21 | 31.093 | | | |
| | | | 2.500 | | |
| | S22 | −221.384 | | | |
| L13 | | | 3.200 | 1.492 | 53.4 |
| | S23 | −45.388 | | | |
| | | | .200 | | |
| | S24 | 146.924 | | | |
| L14 | | | 4.000 | 1.838 | 22.9 |
| | S25 | −119.163 | | | |

| ZOOM SPACING DATA | | | | | |
|---|---|---|---|---|---|
| f/No. | EFL | Z1 | Z2 | Z3 | BFL |
| 3.50 | 36.41 mm | .235 mm | 25.518 mm | 13.839 mm | 59.018 |
| 3.95 | 85.00 | 20.608 | 13.276 | 5.708 | 78.867 |
| 4.36 | 134.97 | 30.045 | 7.312 | 2.235 | 85.895 |
| 4.50 | 191.73 | 37.210 | 1.382 | 1.000 | 83.189 |

Aperture Stop is .980 mm before surface S13

TABLE II

| Lens | Surface | Surface Radii (mm) | Axial Distance Between Surfaces (mm) | $N_D$ | $V_D$ |
|---|---|---|---|---|---|
| L1 | S1 | 78.629 | 2.000 | 1.805 | 25.5 |
|  | S2 | 46.370 | .500 |  |  |
| L2 | S3 | 45.863 | 7.500 | 1.517 | 64.2 |
|  | S4 | −291.553 | .100 |  |  |
| L3 | S5 | 32.713 | 5.200 | 1.487 | 70.4 |
|  | S6 | 93.991 | Z1 |  |  |
| L4 | S7 | 88.500 | 1.600 | 1.834 | 37.3 |
|  | S8 | 17.235 | 7.465 |  |  |
| L5 | S9 | −49.002 | 2.300 | 1.517 | 64.2 |
|  | S10 | −22.894 | 1.197 |  |  |
| L6 | S11 | −19.746 | 1.200 | 1.717 | 48.0 |
|  | S12 | 16.852 |  |  |  |
| L7 | S13 | 2566.654 | 3.300 | 1.805 | 25.5 |
|  | S14 | 124.569 | Z2 |  |  |
| L8 | S15 | −107.819 | 2.300 | 1.834 | 37.3 |
|  | S16 | 214.806 | Z3 |  |  |
| L9 | S17 | −43.256 | 2.600 | 1.517 | 64.2 |
|  | S18 | 20.219 | .100 |  |  |
| L10 | S19 | −32.346 | 5.100 | 1.581 | 40.9 |
| L11 | S20 | 25.218 | 1.600 | 1.755 | 27.5 |
|  |  |  | 15.540 |  |  |
| L12 | S21 | 96.495 | 4.800 | 1.658 | 57.3 |
|  | S22 | −33.609 | 6.086 |  |  |
| L13 | S23 | −21.3558 | 2.000 | 1.805 | 25.5 |
|  | S24 | −35.832 |  |  |  |

ZOOM SPACING DATA

| f/No. | EFL | Z1 | Z2 | Z3 | BFL |
|---|---|---|---|---|---|
| 3.36 | 37.238 mm | 2.330 mm | 10.656 mm | 10.691 mm | 39.140 |
| 3.75 | 56.508 | 10.984 | 6.972 | 5.366 | 44.463 |
| 4.08 | 86.666 | 18.766 | 2.808 | 1.446 | 48.386 |
| 4.15 | 101.841 | 22.550 | .800 | .700 | 46.117 |

Aperture is 1.04 mm before surface S14

TABLE III

| Lens | Surface | Radii (mm) | Axial Distance Between Surfaces (mm) | $N_D$ | $V_D$ |
|---|---|---|---|---|---|
| L1 | S1 | 117.991 | 2.457 | 1.805 | 25.5 |
|  | S2 | 54.142 | .500 |  |  |
| L2 | S3 | 52.810 | 8.745 | 1.487 | 70.4 |
|  | S4 | −235.507 | .098 |  |  |
| L3 | S5 | 46.387 | 3.994 | 1.669 | 44.9 |
|  | S6 | 109.182 | Z1 |  |  |
| L4 | S7 | 78.065 | 1.572 | 1.834 | 37.3 |
|  | S8 | 17.446 | 5.632 |  |  |
| L5 | S9 | −63.185 | 2.600 | 1.487 | 70.4 |
|  | S10 | −27.228 | .600 |  |  |
| L6 | S11 | −24.362 | 1.179 | 1.607 | 59.5 |
|  | S12 | 18.665 |  |  |  |
| L7 | S13 | 103.807 | 3.900 | 1.805 | 25.5 |
|  | S14 | 54.492 | Z2 |  |  |
| L8 | S15 | −151.054 | 3.184 | 1.834 | 37.3 |
|  | S16 | −34.038 | 1.050 |  |  |
| L9 | S17 | −59.328 | 1.818 | 1.785 | 26.1 |
|  | S18 | 42.022 | Z3 |  |  |
| L10 | S19 | −71.425 | 5.795 | 1.541 | 47.2 |
|  | S20 | 81.622 | .098 |  |  |
| L11 | S21 | −23.616 | 13.049 | 1.517 | 52.2 |
|  | S22 | 40.481 | 1.209 | 1.805 | 25.5 |
| L12 | S23 | −146.646 | 2.000 |  |  |
| L13 | S24 | −38.272 | 2.500 | 1.622 | 53.1 |
|  | S25 | 120.413 | .197 |  |  |
| L14 | S26 | −124.605 | 2.500 | 1.785 | 25.7 |

ZOOM SPACING DATA

| f/No. | EFL | Z1 | Z2 | Z3 | BFL |
|---|---|---|---|---|---|
| 3.35 | 28.80 mm | .590 mm | 23.489 mm | 14.738 mm | 50.838 mm |
| 3.80 | 50.00 | 14.896 | 14.437 | 9.485 | 61.441 |
| 4.30 | 85.00 | 26.611 | 7.778 | 4.428 | 71.438 |
| 4.58 | 131.00 | 35.526 | 2.384 | .908 | 76.395 |

Aperture stop is .984 mm before surface S14

TABLE IV

| Lens | Radii (mm) | Axial Distance Between Surfaces (mm) | $N_D$ | $V_D$ |
|---|---|---|---|---|
| L1 | S1 87.088 |  |  |  |
|  | S2 6.073 | 1.487 | 70.4 |  |
|  | −357.220 | 0.200 |  |  |
| L2 | S3 81.894 | 6.904 | 1.517 | 69.7 |
|  | S4 −113.558 | 2.000 | 1.805 | 25.5 |
| L3 | S5 −741.212 | Z1 |  |  |
|  | S6 −145.203 |  |  |  |
| L4 | S7 29.227 | 2.000 | 1.850 | 32.2 |
|  | S8 −40.720 | 5.027 |  |  |
| L5 | S9 −28.743 | 3.218 | 1.617 | 36.6 |
|  | S10 −34.696 | 0.329 |  |  |
| L6 | S11 30.644 | 2.000 | 1.620 | 60.3 |
|  | S12 −836.811 | 4.602 | 1.847 | 23.8 |
| L7 |  | Z2 |  |  |
| L8 | S13 244.236 | 3.347 | 1.847 | 23.8 |
|  | S14 −159.720 | 0.200 |  |  |
| L9 | S15 37.449 | 7.464 | 1.487 | 70.4 |
|  | S16 −59.792 |  |  |  |
| L10 |  | 1.500 | 1.847 | 23.8 |

TABLE IV-continued

| | | | | | |
|---|---|---|---|---|---|
| Z3 | S17 | 128.574 | | | |
| | S18 | 34.377 | | | |
| L11 | | | 7.312 | 1.694 | 53.3 |
| | S19 | 125.375 | | | |
| | | | 12.722 | | |
| | S20 | 40.777 | | | |
| L12 | | | 1.500 | 1.834 | 37.3 |
| | S21 | 17.194 | | | |
| L13 | | | 8.377 | 1.529 | 51.6 |
| | S22 | −45.367 | | | |
| | | | 4.500 | | |
| | S23 | −23.943 | | | |
| L14 | | | 1.500 | 1.850 | 32.2 |
| | S24 | 50.260 | | | |
| | | | 0.724 | | |
| | S25 | 56.060 | | | |
| L15 | | | 3.971 | 1.847 | 23.8 |
| | S26 | −75.126 | | | |

BFL = 38.556

ZOOM SPACING DATA

| f/No. | EFL | Z1 | Z2 | Z3 | BFL |
|---|---|---|---|---|---|
| 2.95 | 41.00 mm | 1.000 mm | 47.969 mm | 14.245 mm | 38.502 mm |
| 3.5 | 85.00 | 17.567 | 26.956 | 4.978 | 52.209 |
| 3.7 | 135.00 | 26.928 | 13.815 | 2.626 | 58.348 |
| 4.1 | 195.00 | 31.136 | 2.000 | .500 | 68.079 |

Aperture stop located just before surface S13 and movable with lens unit group G3.

Table V sets forth the power of each lens lens unit as a ratio of the geometric mean power of the lens.

TABLE V

| Table | $K_1/K_M$ | $K_2/K_M$ | $K_3/K_M$ | $K_4/K_M$ |
|---|---|---|---|---|
| I | 1.008 | −4.748 | .16504 | 1.084 |
| II | .822 | −3.64 | .843 | 1.215 |
| III | .727 | −3.21 | .702 | 1.34 |
| IV | 1.05 | −3.326 | .950 | 1.040 |

In Table V, the power of sub-lens unit G3a of the lens of Table IV is considered as $K_3$ and the power of sub-lens unit G3b is considered as $K_4$.

Table VI sets forth the power of the elements of lens unit G2.

TABLE VI

| Table | L4 | L5($K_A$) | L6 | L7($K_B$) | L7, L8 |
|---|---|---|---|---|---|
| I | −.0248 | .0054 | −.0701 | .0395 | −.0302 |
| II | −.0388 | .0124 | −.0803 | .0479 | −.0312 |
| III | −.0369 | .0105 | −.0583 | .0364 | −.0222 |
| IV | −.0354 | .0070 | −.0387 | .0289 | −.0091 |

Table VII sets forth the ratio of the power $K_A$ of the first positive element of lens unit G2 to the power $K_B$ of the second positive element.

TABLE VII

| Table | $K_A/K_B$ |
|---|---|
| I | 7.32 |
| II | 3.86 |
| III | 3.47 |
| IV | 4.13 |

All of the examples meet the defined parameters of lenses embodying the invention. Lenses embodying the invention have reduced lens unit travel because of the relatively strong optical power of the second lens unit and the second lens unit is of a construction which corrects aberrations while being relatively insensitive to small manufacturing and assembly errors.

It may thus be seen that the objects of the invention set forth, as well as those made apparent from the foregoing description, are efficiently attained. Embodiments of the invention have been set forth for purposes of disclosure; however, modifications to the disclosed embodiments of the invention, as well as other embodiments thereof, may occur to those skilled in the art. Accordingly, the appended claims are intended to cover all embodiments of the invention and modifications to the enclosed embodiments which do not depart from the spirit and scope of the invention.

What is claimed is:

1. In a zoom lens having a range of equivalent focal lengths from a dimension below the diagonal of the image frame of the lens to substantially above, comprising from the object end, a first positive lens unit, a second negative lens unit, a third positive lens unit, and a fourth positive lens unit; at least two of said lens units being movable axially to vary the equivalent focal length of said lens, said second negative lens unit comprising from the object end a negative component, a positive component concave to the object end, and a negative doublet including a biconcave element and a positive element convex to the object end, said positive component being of substantially less optical power than said positive element of said doublet.

2. The lens of claim 1 wherein the ratio of the power of said positive element of said doublet to said positive component is at least three to one.

3. The lens of claim 1 wherein the absolute value of the power $K_2$ of said second lens unit as a ratio to the geometric mean of the extremes of the equivalent focal lengths of said lens is $$3.0 - |K_2/K_M| < 5.0$$

where $K_2$ is the absolute optical power of said second lens unit and $K_M$ is the geometric mean of the extremes of the equivalent focal lengths of said lens.

4. A lens according to claim 1 scaled to an image frame of 24×36 mm defined substantially as follows:

| Lens | | Radii (mm) | Axial Distance Between Surfaces (mm) | $N_D$ | $V_D$ |
|---|---|---|---|---|---|
| L1 | S1 | 82.449 | 2.500 | 1.785 | 26.1 |
| | S2 | 53.360 | | | |
| L2 | | | 7.800 | 1.487 | 70.4 |
| | S3 | −345.520 | | | |
| | | | .110 | | |
| | S4 | 50.867 | | | |
| L3 | | | 5.700 | 1.487 | 70.4 |
| | S5 | 168.401 | | | |
| | | | Z1 | | |
| | S6 | 73.978 | | | |
| L4 | | | 1.400 | 1.834 | 37.3 |
| | S7 | 22.998 | | | |
| | | | 7.520 | | |
| | S8 | −35.332 | | | |
| L5 | | | 3.000 | 1.517 | 64.2 |
| | S9 | −26.613 | | | |
| | | | 1.500 | | |
| | S10 | −24.308 | | | |
| L6 | | | 1.200 | 1.746 | 52.2 |
| | S11 | 19.378 | | | |
| L7 | | | 4.200 | 1.805 | 25.5 |
| | S12 | 300.594 | | | |
| | | | Z2 | | |
| | S13 | 65.464 | | | |
| L8 | | | 2.100 | 1.849 | 38.3 |
| | S14 | −67.241 | | | |
| | | | .540 | | |
| | S15 | −37.319 | | | |

-continued

| Lens | Surface Radii | Axial Distance | $N_D$ | $V_D$ |
|---|---|---|---|---|
| L9 | | 1.300 | 1.839 | 24.5 |
| | S16  −56.687 | | | |
| | | Z3 | | |
| | S17  35.354 | | | |
| L10 | | 4.000 | 1.497 | 76.3 |
| | S18  14660.316 | | | |
| | | .100 | | |
| | S19  59.892 | | | |
| L11 | | 9.944 | 1.487 | 70.4 |
| | S20  −47.300 | | | |
| L12 | | 1.200 | 1.805 | 25.5 |
| | S21  31.093 | | | |
| | | 2.500 | | |
| | S22  −221.384 | | | |
| L13 | | 3.200 | 1.492 | 53.4 |
| | S23  −45.388 | | | |
| | | .200 | | |
| | S24  146.924 | | | |
| L14 | | 4.000 | 1.838 | 22.9 |
| | S25  −119.163 | | | |

ZOOM SPACING DATA

| EFL | Z1 | Z2 | Z3 | BFL |
|---|---|---|---|---|
| 36.41 mm | .235 mm | 25.518 mm | 13.839 mm | 59.018 |
| 85.00 | 20.608 | 13.276 | 5.708 | 78.867 |
| 134.97 | 30.045 | 7.312 | 2.235 | 85.895 |
| 191.73 | 1.382 | 1.000 | | 83.189 |
| 37.210 | | | | | where L1–L14 are lens elements from the object to the image end of the lens, S1–S25 are surface radii of the elements L1–L14, $N_D$ is the index of refraction of each of the lens elements as specified, and $V_D$ is the dispersion of each lens element as measured by its Abbe number.

5. A lens according to claim 1 scaled to an image frame of 24×36 mm defined substantially as follows:

| Lens | Surface Radii (mm) | Axial Distance Between Surfaces (mm) | $N_D$ | $V_D$ |
|---|---|---|---|---|
| L1 | S1  78.629 | | | |
| | | 2.000 | 1.805 | 25.5 |
| | S2  46.370 | | | |
| | | .500 | | |
| L2 | S3  45.863 | | | |
| | | 7.500 | 1.517 | 64.2 |
| | S4  −291.553 | | | |
| | | .100 | | |
| L3 | S5  32.713 | | | |
| | | 5.200 | 1.487 | 70.4 |
| | S6  93.991 | | | |
| | | Z1 | | |
| L4 | S7  88.500 | | | |
| | | 1.600 | 1.834 | 37.3 |
| | S8  17.235 | | | |
| | | 7.465 | | |
| L5 | S9  −49.002 | | | |
| | | 2.300 | 1.517 | 64.2 |
| | S10  −22.894 | | | |
| | | 1.197 | | |
| L6 | S11  −19.746 | | | |
| | | 1.200 | 1.717 | 48.0 |
| L7 | S12  16.852 | | | |
| | | 3.300 | 1.805 | 25.5 |
| | S13  2566.654 | | | |
| | | Z2 | | |
| L8 | S14  124.569 | | | |
| | | 2.300 | 1.834 | 37.3 |
| | S15  −107.819 | | | |
| | | Z3 | | |
| L9 | S16  214.806 | | | |
| | | 2.600 | 1.517 | 64.2 |
| | S17  −43.256 | | | |
| | | .100 | | |
| L10 | S18  20.219 | | | |
| | | 5.100 | 1.581 | 40.9 |
| | S19  −32.346 | | | |
| L11 | | 1.600 | 1.755 | 27.5 |
| | S20  25.218 | | | |
| | | 15.540 | | |
| | S21  96.49 | | | |
| L12 | | 4.800 | 1.658 | 57.3 |
| | S22  −33.609 | | | |
| | | 6.086 | | |
| | S23  −21.3558 | | | |
| L13 | | 2.000 | 1.805 | 25.5 |
| | S24  −35.832 | | | |

ZOOM SPACING DATA

| EFL | Z1 | Z2 | Z3 | BFL |
|---|---|---|---|---|
| 37.238 mm | 2.330 mm | 10.656 mm | 10.691 mm | 39.140 |
| 56.508 | 10.984 | 6.972 | 5.366 | 44.463 |
| 86.666 | 18.766 | 2.808 | 1.446 | 48.386 |
| 101.841 | 21.550 | .800 | .700 | 46.117 | where L1–L13 are lens elements from the object to the image end of the lens, S1–S24 are surface radii of the elements L1–L13, $N_D$ is the index of refraction of each of the lens elements as specified, and $V_D$ is the dispersion of each lens element as measured by its Abbe number.

6. A lens according to claim 1 scaled to an image frame of 24×36 mm defined substantially as follows:

| Lens | Radii (mm) | Axial Distance Between Surfaces (mm) | $N_D$ | $V_D$ |
|---|---|---|---|---|
| L1 | S1  117.991 | | | |
| | | 2.457 | 1.805 | 25.5 |
| | S2  54.142 | | | |
| | | .500 | | |
| L2 | S3  52.810 | | | |
| | | 8.745 | 1.487 | 70.4 |
| | S4  −235.507 | | | |
| | | .098 | | |
| L3 | S5  46.387 | | | |
| | | 3.994 | 1.669 | 44.9 |
| | S6  109.182 | | | |
| | | Z1 | | |
| L4 | S7  78.065 | | | |
| | | 1.572 | 1.834 | 37.3 |
| | S8  17.446 | | | |
| | | 5.632 | | |
| L5 | S9  −63.185 | | | |
| | | 2.600 | 1.487 | 70.4 |
| | S10  −27.228 | | | |
| | | .600 | | |
| L6 | S11  −24.362 | | | |
| | | 1.179 | 1.607 | 59.5 |
| L7 | S12  18.665 | | | |
| | | 3.900 | 1.805 | 25.5 |
| | S13  103.807 | | | |
| | | Z2 | | |
| L8 | S14  54.492 | | | |
| | | 3.184 | 1.834 | 37.3 |
| | S15  −151.054 | | | |
| | | 1.050 | | |
| | S16  −34.038 | | | |
| L9 | | 1.818 | 1.785 | 26.1 |
| | S17  −59.328 | | | |
| | | Z3 | | |
| | S18  42.022 | | | |
| L10 | | 5.795 | 1.541 | 47.2 |
| | S19  −71.425 | | | |
| | | .098 | | |
| | S20  81.622 | | | |
| L11 | | 13.049 | 1.517 | 52.2 |
| | S21  −23.616 | | | |
| L12 | | 1.209 | 1.805 | 25.5 |
| | S22  40.481 | | | |
| | | 2.000 | | |
| | S23  −146.646 | | | |
| L13 | | 2.500 | 1.622 | 53.1 |
| | S24  −38.272 | | | |
| | | .197 | | |
| | S25  120.413 | | | |

-continued

| Lens | | Radii | Axial Distance Between Surfaces (mm) | $N_D$ | $V_D$ |
|---|---|---|---|---|---|
| L14 | | | 2.500 | 1.785 | 25.7 |
| | S26 | −124.605 | | | |

ZOOM SPACING DATA

| EFL | Z1 | Z2 | Z3 | BFL |
|---|---|---|---|---|
| 28.80 mm | .590 mm | 23.489 mm | 14.738 mm | 50.838 |
| 50.00 | 14.896 | 14.437 | 9.485 | 61.441 |
| 85.00 | 26.611 | 7.778 | 4.428 | 71.438 |
| 131.00 | 35.526 | 2.384 | .908 | 76.395 | where L1–L14 are lens elements from the object to the image end of the lens, S2–S26 are surface radii of the elements L1–L14, $N_D$ is the index of refraction of each of the lens elements as specified, and $V_D$ is the dispersion of each lens element as measured by its Abbe number.

7. A lens according to claim 1 scaled to an image frame of 24×36 mm defined substantially as follows:

| Lens | | Radii (mm) | Axial Distance Between Surfaces (mm) | $N_D$ | $V_D$ |
|---|---|---|---|---|---|
| | S1 | 87.088 | | | |
| L1 | | | 6.073 | 1.487 | 70.4 |
| | S2 | −357.220 | | | |
| | | | 0.200 | | |
| | S3 | 81.894 | | | |
| L2 | | | 6.904 | 1.517 | 69.7 |
| | S4 | −113.558 | | | |
| L3 | | | 2.000 | 1.805 | 25.5 |
| | S5 | −741.212 | | | |
| | | | Z1 | | |
| | S6 | −145.203 | | | |
| L4 | | | 2.000 | 1.850 | 32.2 |
| | S7 | 29.227 | | | |
| | | | 5.027 | | |
| | S8 | −40.720 | | | |
| L5 | | | 3.218 | 1.617 | 36.6 |
| | S9 | −28.743 | | | |
| | | | 0.329 | | |
| | S10 | −34.696 | | | |
| L6 | | | 2.000 | 1.620 | 60.3 |
| | S11 | 30.644 | | | |
| L7 | | | 4.602 | 1.847 | 23.8 |
| | S12 | −836.811 | | | |
| | | | Z2 | | |
| | S13 | 244.236 | | | |
| L8 | | | 3.347 | 1.847 | 23.8 |
| | S14 | −159.720 | | | |
| | | | 0.200 | | |
| | S15 | 37.449 | | | |
| L9 | | | 7.464 | 1.487 | 70.4 |
| | S16 | −59.792 | | | |
| L10 | | | 1.500 | 1.847 | 23.8 |
| | S17 | 128.574 | | | |
| | | | Z3 | | |
| | S18 | 34.377 | | | |
| L11 | | | 7.312 | 1.694 | 53.3 |
| | S19 | 125.375 | | | |
| | | | 12.722 | | |
| | S20 | 40.777 | | | |
| L12 | | | 1.500 | 1.834 | 37.3 |
| | S21 | 17.194 | | | |
| L13 | | | 8.377 | 1.529 | 51.6 |
| | S22 | −45.367 | | | |
| | | | 4.500 | | |
| | S23 | −23.943 | | | |
| L14 | | | 1.500 | 1.850 | 32.2 |
| | S24 | 50.260 | | | |
| | | | 0.724 | | |
| L15 | | | 3.971 | 1.847 | 23.8 |
| | S26 | −75.126 | | | |

BFL = 38.556

ZOOM SPACING DATA

| EFL | Z1 | Z2 | Z3 | BFL |
|---|---|---|---|---|
| 41.00 mm | 1.000 mm | 47.969 mm | 14.245 mm | 38.502 mm |
| 85.00 | 17.567 | 26.956 | 4.978 | 52.209 |
| 135.00 | 26.928 | 13.815 | 2.626 | 58.348 |
| 195.00 | 31.136 | 2.000 | .500 | 68.079 | where L1–L15 are lens elements from the object to the image end of the lens, S1–S26 are surface radii of the elements L1–L15, $N_D$ is the index of refraction of each of the lens elements as specified, and $V_D$ is the dispersion of each lens element as measured by its Abbe number.

8. The lens of claim 1 where said first and fourth lens units move in fixed relation.

9. The lens of claim 8 where said second lens unit moves in opposite direction to said first and fourth lens units as the equivalent focal length is varied, and said third lens unit remains stationary.

10. The lens of claim 1 where said second and said third and fourth lens units move in opposite directions to vary the equivalent focal length of said first lens unit remains stationary.

* * * * *